United States Patent
Kim

(10) Patent No.: US 9,124,756 B2
(45) Date of Patent: Sep. 1, 2015

(54) METHOD AND APPARATUS FOR DATA COMMUNICATION USING DIGITAL IMAGE PROCESSING

(71) Applicant: Samsung Electronics Co., Ltd., Suwon-si, Gyeonggi-do (KR)

(72) Inventor: Taesoo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/861,932

(22) Filed: Apr. 12, 2013

(65) Prior Publication Data

US 2013/0286228 A1     Oct. 31, 2013

(30) Foreign Application Priority Data

Apr. 27, 2012  (KR) .................. 10-2012-0044313

(51) Int. Cl.
| | |
|---|---|
| *H04N 5/225* | (2006.01) |
| *H04N 5/232* | (2006.01) |
| *H04N 5/08* | (2006.01) |
| *H04B 10/116* | (2013.01) |
| *H04M 1/725* | (2006.01) |

(52) U.S. Cl.
CPC .............. *H04N 5/08* (2013.01); *H04B 10/116* (2013.01); *H04M 1/7253* (2013.01); *H04M 2250/52* (2013.01)

(58) Field of Classification Search
USPC .......................................... 348/207.1, 207.11
See application file for complete search history.

(56) References Cited

U.S. PATENT DOCUMENTS

| | | | |
|---|---|---|---|
| 2004/0012686 A1* | 1/2004 | Ono et al. ................ | 348/211.99 |
| 2005/0085188 A1 | 4/2005 | Ishii et al. | |
| 2005/0254714 A1 | 11/2005 | Anne | |
| 2006/0013291 A1 | 1/2006 | Hashimoto et al. | |
| 2006/0092835 A1 | 5/2006 | Lee | |
| 2007/0274400 A1* | 11/2007 | Murai et al. ............. | 375/240.26 |
| 2008/0320174 A1* | 12/2008 | Lee et al. .......................... | 710/4 |
| 2010/0110088 A1* | 5/2010 | Lee et al. ....................... | 345/520 |
| 2010/0124408 A1* | 5/2010 | Maeoka ........................ | 386/111 |
| 2010/0208083 A1* | 8/2010 | Lee et al. .................... | 348/207.1 |
| 2011/0007171 A1 | 1/2011 | Okumura et al. | |
| 2011/0069971 A1 | 3/2011 | Kim et al. | |
| 2011/0176009 A1* | 7/2011 | Choi et al. ................ | 348/207.1 |

FOREIGN PATENT DOCUMENTS

| | | |
|---|---|---|
| EP | 1705880 A2 | 9/2006 |
| KR | 10-2011-0044045 A | 4/2011 |

\* cited by examiner

*Primary Examiner* — Roberto Velez
*Assistant Examiner* — Stephen Coleman
(74) *Attorney, Agent, or Firm* — Jefferson IP Law, LLP

(57) ABSTRACT

A method and an apparatus for data communication using digital image processing are provided. The method for transmitting data using digital image processing includes displaying a reference image including one or more frames having preset image quality and including clock data for data synchronization in each frame, determining whether a confirmation signal indicating that transmission of data is possible is received within a preset time, and displaying a corrected reference image having image quality differing from the preset image quality when the confirmation signal is not received within the preset time. Data may thus be transmitted without a separate transceiver supporting a certain communication scheme, and data synchronization between a receiving end and a sending end is thus possible to more conveniently transmit/receive data.

24 Claims, 8 Drawing Sheets

METHOD AND APPARATUS FOR DATA COMMUNICATION USING DIGITAL IMAGE PROCESSING

PRIORITY

This application claims the benefit under 35 U.S.C. §119(a) of a Korean patent application filed on Apr. 27, 2012 in the Korean Intellectual Property Office and assigned Serial No. 10-2012-0044313, the entire disclosure of which is hereby incorporated by reference.

BACKGROUND OF THE INVENTION

1. Field of the Invention

The present invention relates to a method and an apparatus for data communication using digital image processing. More particularly, the present invention relates to a method for synchronizing a receiving side terminal with a transmitting side terminal upon transmission of data, and an apparatus thereof.

2. Description of the Related Art

In a case of general near distance data communication, data communication is performed using at least one of a wired communication technology and a wireless communication technology such as Bluetooth, wireless Local Area Network (LAN), and Infrared Data Association (IrDa).

There is a need for a cable for communication in a case of existing wired communication. There is also a substantial need for a transceiver supporting a corresponding communication scheme, such as a chip or an antenna for wireless communication, corresponding to the wireless communication technology.

In a case of a Bluetooth communication scheme according to the related art, a data transmission bandwidth is low, approximately several hundred kilobits per second (Kbps), and is not suited to large capacity data transmission. In a case of an 802.11b/g/n standard, since power consumption is large, this can render a part inappropriate to be used in a mobile device. In a case of an IrDa communication according to the related art, there is a problem in that compatibility between terminals may not be achieved. In a case of a portable phone according to the related art, a communication is possible without a separate device during transmission of data using a wireless network, but a possibly expensive use fee of the communication network can occur.

To address the foregoing problems, as an alternative approach, a method and an apparatus for transmitting data, capable of transmitting data without a separate transceiver, using a display device and a camera shown in FIG. 1 have been developed.

FIG. 1 is a diagram illustrating a data communication device using digital image processing according to the related art.

However, in the method and apparatus for transmitting data, there is a demand for synchronization for transmitting Red/Green/Blue (RGB) data of a certain format displayed on a screen and data between transmitting side and receiving side cameras.

SUMMARY OF THE INVENTION

Aspects of the present invention are to address at least the above-mentioned problems and/or disadvantages and to provide at least the advantages described below. Accordingly, an aspect of the present invention is to provide a method for data communication using digital image processing which may convert data to be transmitted from a terminal with a display or other display devices into Red/Green/Blue (RGB) data of a predetermined format and display the RGB data on a screen, photograph the displayed data by a camera, and synchronize the data between a receiving end and a sending end when transmitting the data without a separate transceiver, and an apparatus thereof. For example, the display of a sending terminal may function analogously to a transmitter, and a camera of a receiving terminal may function analogously to a receiver. Thus, a visible data image may function analogously to a transmission medium.

In accordance with an aspect of the present invention, a method for transmitting data using digital image processing is provided. The method includes displaying a reference image including one or more frames having preset image quality and including clock data for data synchronization in each frame, determining whether a confirmation signal indicating that transmission of data is possible is received within a preset time, and displaying a corrected reference image having image quality differing from the preset image quality when the confirmation signal is not received within the preset time.

In accordance with another aspect of the present invention, a method for receiving data using digital image processing is provided. The method includes photographing a reference image including one or more frames displayed on a sending side with preset quality of a photographed image, comparing quality of a photographed image with image quality of the photographed reference image to determine whether transmission of data is possible, changing the quality of the photographed image when the transmission of data is possible, and photographing, with the changed quality of the photographed image, the reference image.

In accordance with yet another aspect of the present invention, an apparatus for transmitting data using digital image processing is provided. The apparatus includes a display unit for displaying an image including one or more frames, a memory for storing a reference image having preset image quality and including clock data for data synchronization in each frame and data to be transmitted, a signal receiver for receiving a confirmation signal indicating that transmission of data is possible, and a controller for controlling to display the reference image, for determining whether the confirmation signal is received within a preset time, and for controlling such that a corrected reference image having image quality differing from the preset image quality is displayed when the confirmation signal is not received within a preset time.

In accordance with still another aspect of the present invention, an apparatus for receiving data using digital image processing is provided. The apparatus includes a camera module for photographing an image including one or more frames displayed on a sending side, and a controller for controlling to photograph a reference image displayed on the sending side with preset quality of a photographed image, for comparing the quality of the photographed image with image quality of the photographed reference image to determine whether transmission of data is possible, changing the quality of the photographed image when the transmission of data is possible, and controlling such that the reference image is photographed with the changed quality of the photographed image.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following detailed description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
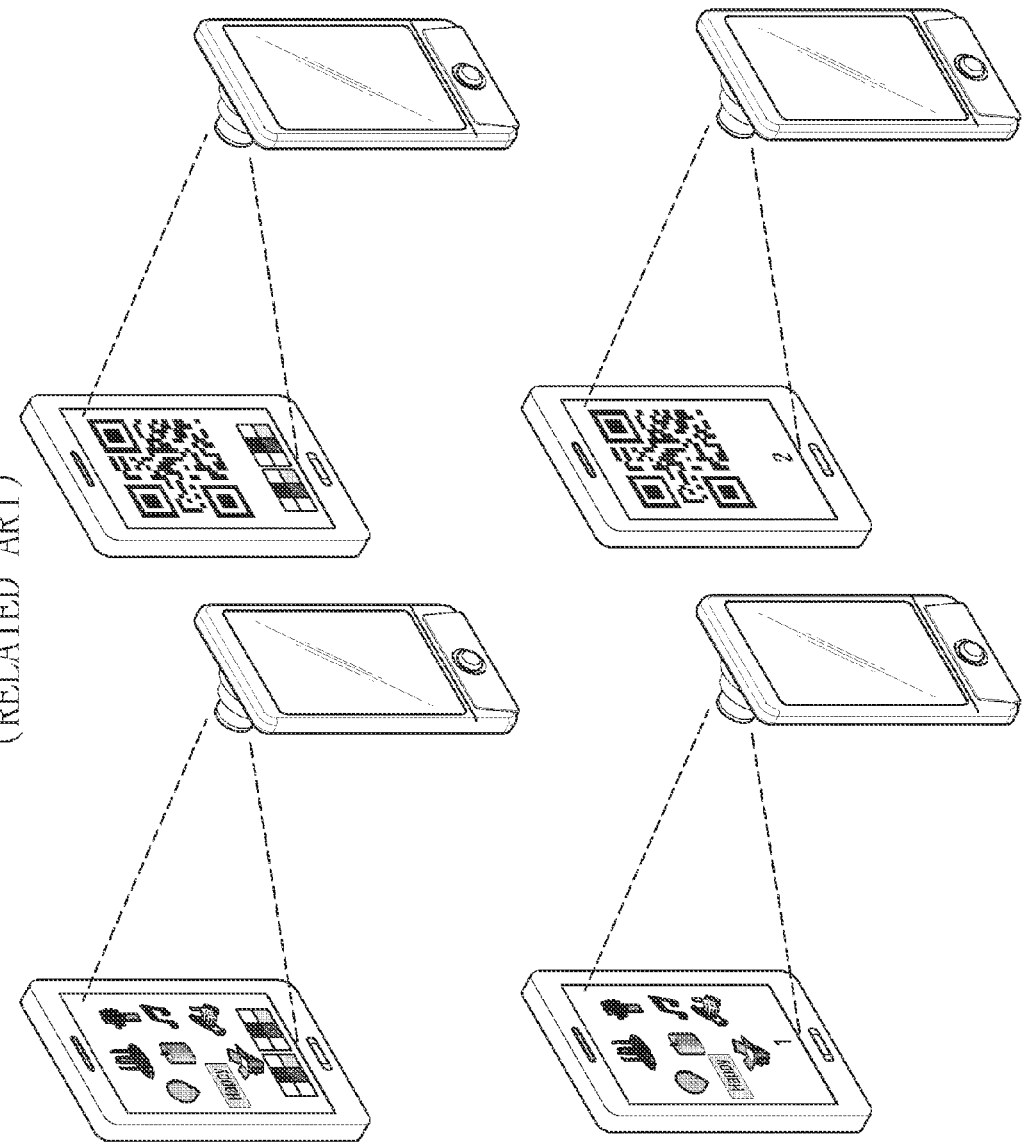
FIG. 1 is a diagram illustrating a data communication device using digital image processing according to the related art.
Figure 2:
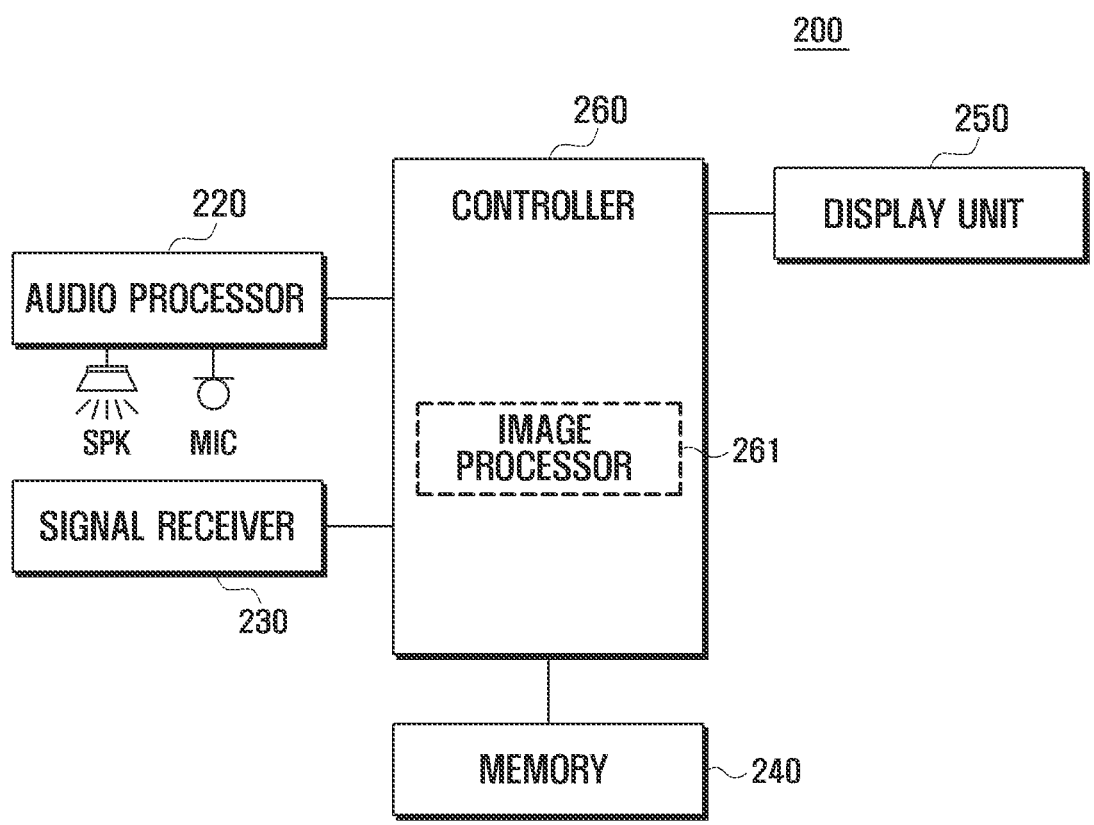
FIG. 2 is a block diagram illustrating an internal configuration of an apparatus for transmitting data using digital image processing according to an exemplary embodiment of the present invention.

FIG. 2 is a block diagram illustrating an internal configuration of an apparatus for transmitting data using digital image processing according to an exemplary embodiment of the present invention.

Referring to FIG. 2, an apparatus 200 for transmitting data using digital image processing according to an exemplary embodiment of the present invention may include an audio processor 220, a signal receiver 230, a memory 240, a display unit 250, and a controller 260.

The audio processor 220 may be configured by a COder-DECoder (CODEC). The CODEC may include a data CODEC processing packet data and the like, and an audio CODEC processing an audio signal such as a voice. The audio processor 220 converts a digital audio signal into an analog audio signal through the audio CODEC and plays the converted analog audio signal through a speaker SPK, and similarly converts an analog audio signal input from a microphone MIC into a digital audio signal through the audio CODEC.

The audio processor 220 according to an exemplary embodiment of the present invention may receive an audio signal as a confirmation signal indicating that transmission of data is possible from an apparatus for receiving data. In a case where there is a preset audio signal between the apparatus for transmitting data and the apparatus for receiving data, when the apparatus for receiving data outputs the preset audio signal, the audio processor 220 may receive the preset audio signal using the microphone MIC and transmit it to the controller 260. The preset audio signal may include, for example, an audio signal of a certain frequency, a specific sound, a beep sound having a specific interval, a specific melody, or an audio signal distinguished from other sounds.

The signal receiver 230 according to an exemplary embodiment of the present invention may receive a confirmation signal indicating that transmission of data is possible from an apparatus for receiving data. There may be various devices capable of receiving signals as an example of the signal receiver 230. The signal receiver 230 may include various devices such as a Bluetooth module, a wireless Local Area Network (LAN), and an Infrared Data Association (IrDa) device. The audio processor 220 may be configured as a separate block, but act as the signal receiver 230.

The memory 240 functions to store programs and data used for an operation of the apparatus 200 for transmitting data using digital image processing, and may be divided into a program area and a data area. The program area may store a program for controlling an overall operation of the apparatus 200 for transmitting data, an Operation System (OS) for booting the apparatus 200 for transmitting data, an application program necessary for playing multi-media contents, and application programs necessary for other functions of the apparatus 200 for transmitting data, for example, a voice playback function, or an image or moving image playback function. The data area is an area in which data generated according to use of the apparatus 200 for transmitting data is stored, and may store data such as images, moving images, phone books, and audio data. The memory 140 according to an exemplary embodiment of the present invention stores a reference image having various preset image qualities, and data to be transmitted.

The display unit 250 may be configured by a Liquid Crystal Display (LCD), Organic Light Emitting Diodes (OLED), or an Active Matrix Organic Light Emitting Diode (AMOLED), and visually provides menus of the apparatus 200 for transmitting data, input data, function setting information, and other various information to a user.

The display unit 250 according to the exemplary embodiment of the present invention may a reference image having preset image quality and including clock data for synchronizing data with each frame. Further, the display unit 250 may display data image converted from data to be transmitted. The reference image will be described in more detail below.

The controller 260 controls an overall operation of respective structural elements of the apparatus 200 for transmitting data. In particular, the controller 260 may control a series of procedures as follows. That is, the controller 260 displays the reference image having preset image quality. The controller 260 determines whether a confirmation signal indicating that transmission of data is possible is received within a preset time. When it is determined that the confirmation signal is not received within the preset time, the controller 260 controls such that a corrected reference image having image quality differing from the preset image quality is displayed. To do this, the controller 260 according to an exemplary embodiment of the present invention may further include an image processor 261.

The controller 260 retrieves the reference image having the preset image quality stored in the memory 240 and controls the display unit 250 to display the retrieved reference image, and determines whether a confirmation signal, indicating that transmission of data is possible, is received through the audio processor 220 or the signal receiver 230 within the preset time. In this case, when it is determined that the confirmation signal is not received within the preset time, the controller 260 may retrieve a corrected reference image having different image quality from the memory 240 and control the display unit 250 to display the retrieved corrected reference image. When the confirmation signal is not received within the preset time, it may be recognized that a camera of a receiving side is not synchronized with the reference signal. Accordingly, to determine image quality according to the quality of an image photographed by the camera of the receiving side, the display unit 250 displays the corrected reference image having image quality differing from the image quality of the reference image under control of the controller 260.

In an exemplary embodiment of the present invention, when the controller 260 determines that the confirmation signal is received within the preset time, the image processor 261 may convert data to be transmitted into a data image having the quality of the reference image. The controller 260 may control the display unit 250 to display the data image. In an exemplary embodiment of the present invention, the image processor 261 may convert the data to be transmitted into Red/Green/Blue (RGB) data of preset format. In an exemplary embodiment of the present invention, since there is a need for data synchronization of a receiving end and a sending end to display a moving image, to photograph the moving image, and to transmit/receive the photographed data, RGB data of a certain format may include a reference image signal.

The image processor 261 may convert source data to be transmitted into an image having various image qualities. Here, the image quality is determined by the number of frames per unit time, although this is not required. The greater the number of frames per unit time is, the better the image quality is. When receiving the confirmation signal, the image processor 261 generates a data image having the number of frames corresponding to the quality of an image photographed by a camera of the receiving side.

When displaying the corrected reference image, the controller 260 controls such that the corrected reference image having the image quality differing from that of the reference image is displayed. In this case, the controller 260 may control such that a corrected reference image having a number of frames per unit time less than that of a current reference image is displayed.

When the quality of the image photographed by the camera of the receiving side is better than the quality of the displayed reference image, that is, when the number of frames per unit time in the quality of an image photographed by the camera of the receiving side is greater than that of the displayed reference image, although the quality of the image photographed by the camera is identical with the quality of the reference image, the receiving side may recognize a variation in clock data included in the reference image to check and process the number of frames in an image to be transmitted. In this case, it is convenient for the receiving side to control the quality of a photographed image and to reduce the quality of the photographed image to correspond to the image quality of the displayed reference image. That is, the receiving side determines whether clock data included in the displayed reference image is interrupted to compare the number of frames per unit time in the photographed image with that in the photographed reference image, thereby determining whether the number of frames per unit time in the photographed image quality is identical with that in the photographed reference image. When the number of frames per unit time in the photographed image quality differs from that in the photographed reference image, the receiving side may reduce the photographed image quality and control the quality of the photographed image to correspond to the quality of the reference image. For example, if photographed image quality of the camera of the receiving side is greater than image quality of the displayed reference image, then the photograph image quality of the camera of the receiving side may be adjusted downwards to match the lower image quality of the reference image.

However, when the quality of an image photographed by the camera in the receiving side is worse than the image quality of the reference image, that is, when the number of frames per unit time of the photographed image quality by the camera of the receiving side is less than that of the image quality in the reference image, there is greater probability of failing recognition of the reference image by the receiving side. Accordingly, in this case, since it is more convenient for the sending side to control the image quality of the reference image, the controller 260 of the sending side controls the display unit 250 to reduce the quality of the reference image and to display the corrected reference image.

In an exemplary embodiment of the present invention, the reference image has preset image quality and includes clock data for data synchronization with each frame. Continuous characters, numerals, alphabets, or images are displayed on the reference image. The continuous alphabets or images are displayed as a certain number of frames per unit time. Moreover, the clock data includes an image signal for synchronizing data. In an exemplary embodiment of the present invention, the clock data may include, for example, variation in color, variation in luminance, or binary variation using dots. Examples of the reference images are illustrated in FIGS. 6 to 8.

Figure 6:
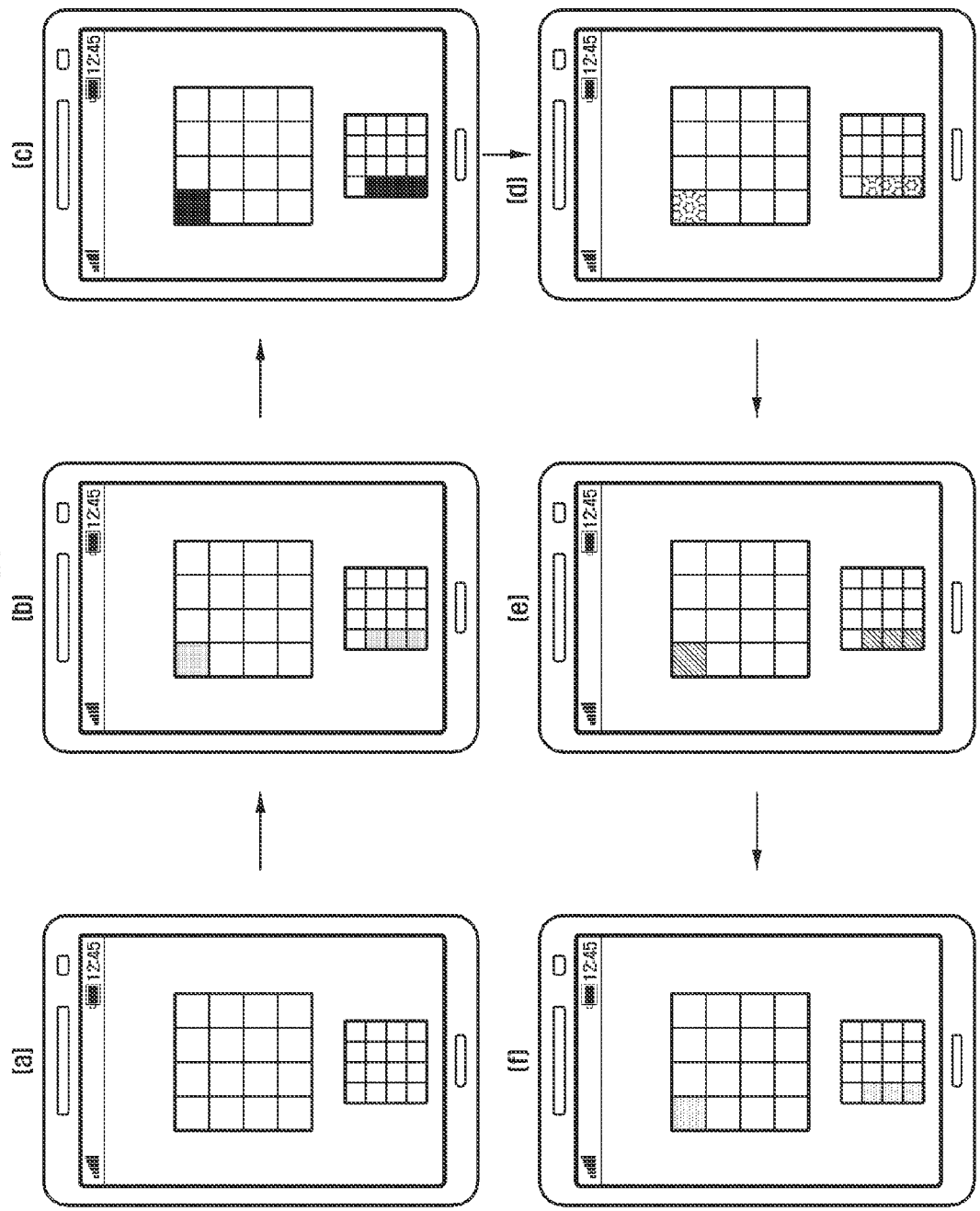
FIG. 6 is a diagram illustrating a reference image according to an exemplary embodiment of the present invention.
Figure 7:
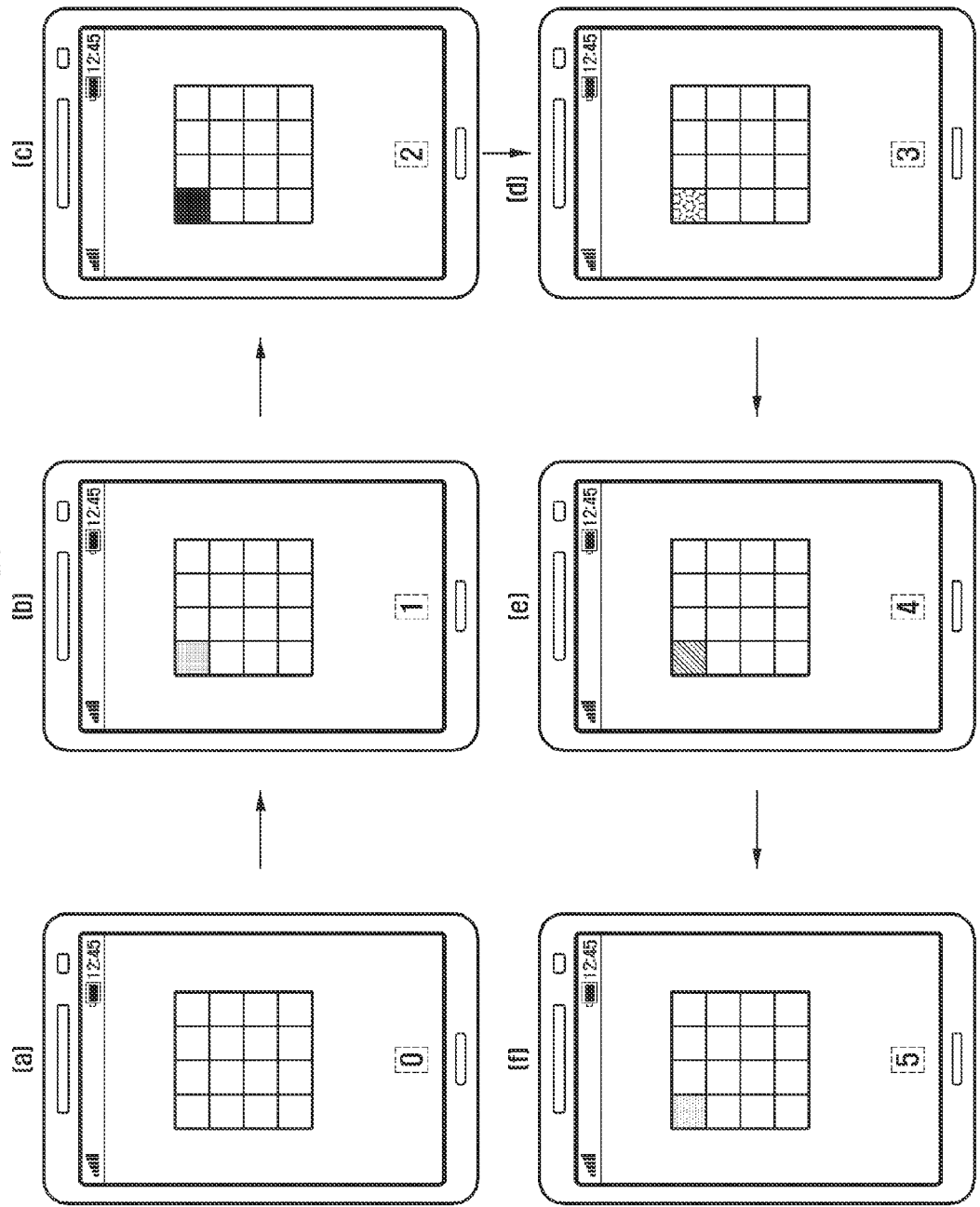
FIG. 7 is a diagram illustrating a reference image according to an exemplary embodiment of the present invention.
Figure 8:
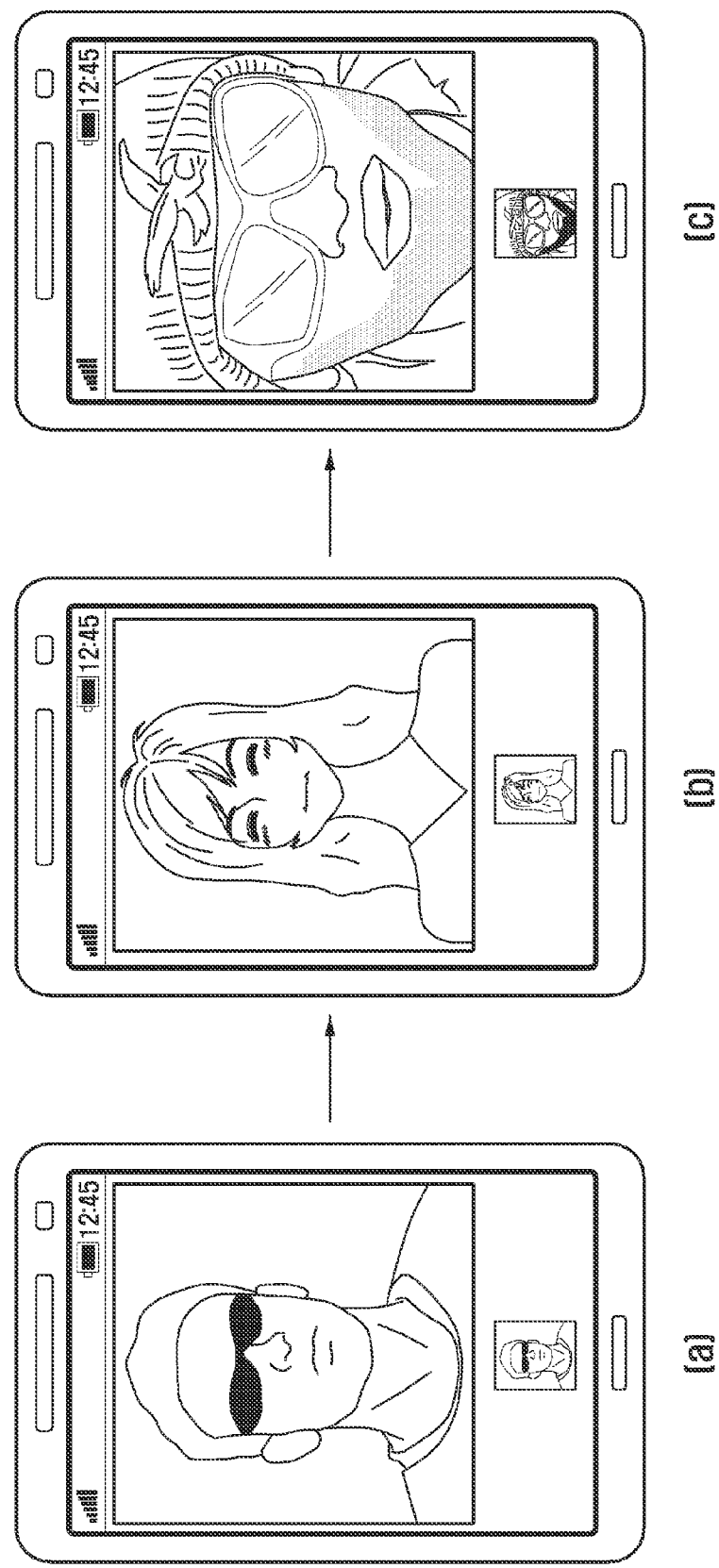
FIG. 8 is a diagram illustrating a reference image according to an exemplary embodiment of the present invention.

FIGS. 6 to 8 are diagrams illustrating a reference image according to an exemplary embodiment of the present invention. FIG. 6 illustrates continuous clock data obtained by changing colors and brightness of dots according to a variation in each frame according to an exemplary embodiment of the present invention. In the same manner, characters, numerals, or images are continuously displayed in FIGS. 7 and 8 according to an exemplary embodiment of the present invention. The clock data is included in each frame of a reference image having the certain number of frames per unit time. The receiving side may receive the reference image and determine which image quality has the reference image, that is, how many frames per unit time are in the reference image.

The foregoing exemplary embodiment has illustrated that the controller 260 and the image processor 261 are configured by separate blocks, and respective blocks performs different functions. This is merely for the purposes of convenience of description. However, the functions are not required to be separated. For example, it should be noted that the controller 260 itself may perform a certain function described above as being performed by the image processor 261.

Figure 3:
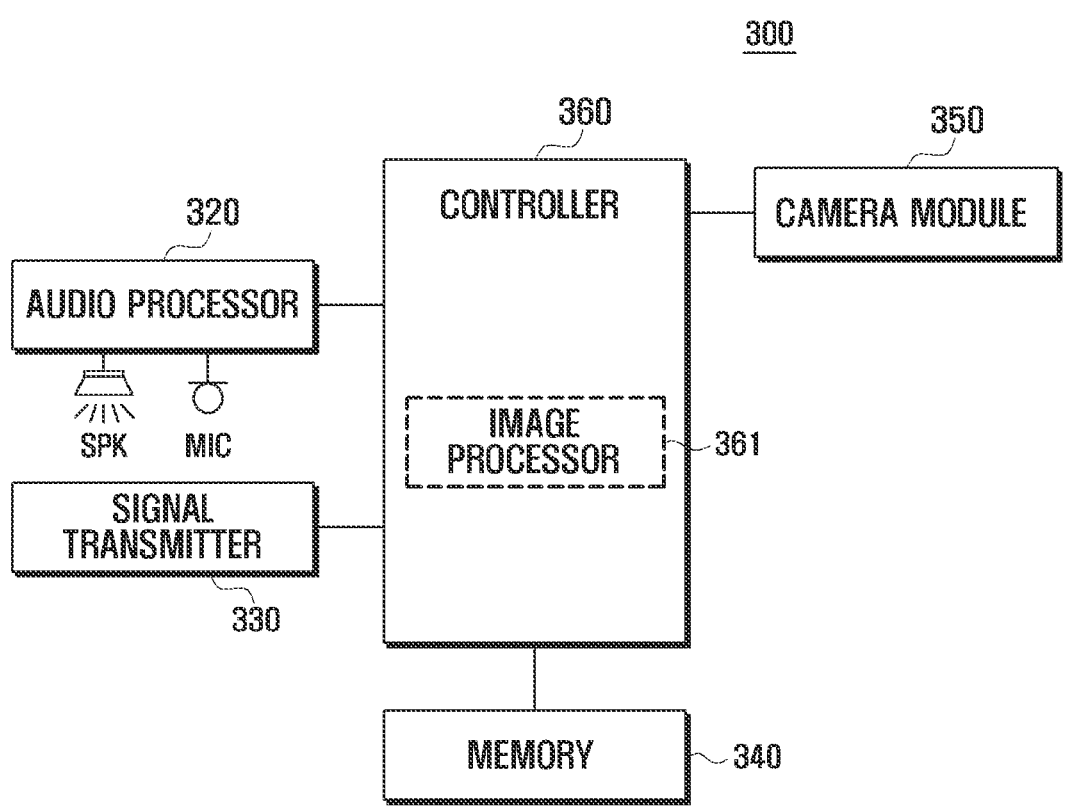
FIG. 3 is a block diagram illustrating an internal configuration of an apparatus for receiving data using digital image processing according to an exemplary embodiment of the present invention.

FIG. 3 is a block diagram illustrating an internal configuration of an apparatus for receiving data using digital image processing according to an exemplary embodiment of the present invention.

Referring to FIG. 3, the apparatus 300 for receiving data using digital image processing according to an exemplary embodiment of the present invention may include an audio processor 320, a signal transmitter 330, a memory 340, a camera module 350, and a controller 360.

Note that a primary difference between the apparatus 200 for transmitting data of FIG. 2 and the apparatus 300 for receiving data of FIG. 3 is that the apparatus 200 for transmitting data includes a display unit 250, and the apparatus 300 for receiving data includes a camera module 350. The display unit 250 and the camera module 350 are not mutually exclusive; for example, a single apparatus according to exemplary embodiments of the present invention might include both the display 250 and the camera module 350.

The audio processor 320 of the apparatus 300 for receiving data has substantially the same functions as those of the audio processor 220 of the apparatus 200 for transmitting data. The audio processor 320 according to an exemplary embodiment of the present invention may compare quality of the photographed image with quality of a photographed reference image. When transmission of data is possible, the audio processor 320 may output a preset audio signal using a speaker SPK.

The preset audio signal may include an audio signal of a certain frequency, a specific sound, a beep sound having a specific interval, a specific melody, or an audio signal distinguished from other sounds.

The signal transmitter 330 may transmit a confirmation signal, indicating that transmission of data to the apparatus 300 for receiving data is possible, to the apparatus 200 for transmitting data. There may be various devices capable of transmitting signals as an example of the signal transmitter 330. The signal transmitter 330 may include various devices such as a Bluetooth module, a wireless LAN, and an IrDa device. The audio processor 320 may be configured as a separate block, but may also act as the signal transmitter 330.

The memory 340 of the apparatus 300 for receiving data has substantially the same functions as those of the memory 240 of the apparatus 200 for transmitting data. The memory 340 according to an exemplary embodiment of the present invention may store a photographed image displayed on a sending side.

The camera module 350 includes a camera sensor (not shown) for photographing a subject and converting an optical signal into an electric signal, and a signal processor (not shown) for converting an analog image signal into digital data. Here, the camera sensor may include a Charge Coupled Device (CCD) sensor or a Complementary Metal Oxide Semiconductor (CMOS) sensor. The signal processor may be implemented by a Digital Signal Processor (DSP). The camera sensor and the signal processor may be implemented integrally or separately.

The camera module 350 according to an exemplary embodiment of the present invention photographs an image displayed on a display unit 250 of the sending end according to a command of a user. The camera module 350 photographs an image displayed on the display unit 250 of the sending side, and converts the image into an electric signal, and transfers the electric signal to the controller 350. In this case, when the camera module 350 photographs the image displayed on the display unit 250, various qualities of a photographed image may be set.

The controller 360 controls an overall operation of respective structural elements of the apparatus 300 for receiving data. In particular, the controller 360 may control a series of procedures as follows. The controller 360 controls the camera module 350 to photograph a reference image displayed on the sending side with preset quality of the photographed image. The controller 360 compares quality of a photographed image with the quality of the photographed reference image to determine whether transmission of data is possible. When it is determined that transmission of the data is not possible, the controller 360 changes the photographed image quality. The controller 360 controls the camera module 350 to photograph the reference image with the changed quality of the photographed image. Here, the quality of the photographed image is determined by a number of frames per unit time. The greater the number of frames per unit time is, the better the image quality is.

Further, when it is determined that the transmission of the data is possible, the controller 360 may control the signal transmitter 330 to transmit the confirmation signal, and control the camera module 350 to photograph a data image obtained by converting data to be transmitted into an image having the quality of the reference image. Further, the controller 360 may convert the photographed data image into original data. To do this, the controller 360 according to an exemplary embodiment of the present invention may further include an image processor 361. The image processor 361 may convert a received data image into original data.

The foregoing exemplary embodiment has illustrated that the controller 360 and the image processor 361 are configured by separate blocks, and respective blocks performs different functions. This is merely for purposes for convenience of a description. However, the functions are not required to be separated. For example, it should be noted that the controller 360 itself may perform a certain function described above as being performed by the image processor 361.

When determining whether transmission of data is possible, the controller 360 determines whether the number of frames per unit time in the photographed reference image is identical with that in the photographed image. When the number of frames per unit time in the photographed reference image is identical with that in the photographed image quality, because data synchronization is achieved, the controller 360 determines that the data may be transmitted and sends the confirmation signal.

When the quality of a photographed image is changed, the controller 360 may control the camera module 350 to have quality of the photographed image differ from preset quality of the photographed image. In this case, the controller 360 may control the number of frames per unit time to be less than that of currently set quality of the photographed image.

When the quality of an image photographed by the camera module 350 is worse than the quality of the displayed reference image on the sending side, that is, when the number of frames per unit time of the quality of the photographed image is less than that of the quality in the displayed reference image, there is greater probability of failing recognition of the reference image by the receiving side. Accordingly, in this case, since it is more convenient for the sending side to control the image quality of the reference image, the controller 260 preferably reduces the quality of the reference image and displays the corrected reference image.

Conversely, when the quality of the image photographed by the camera module 350 is better than image quality of the displayed reference image, that is, when the number of frames per unit time of the quality of an image photographed by the camera module is greater than that of the displayed reference image, the camera module 350 may recognize variation in clock data included in the reference image to check and process the number of frames in an image to be transmitted. Accordingly, in this case, because it is more convenient to control the quality of the image photographed by the camera module 350, the controller 360 may control the camera module 350 to reduce the quality of the photographed image and to photograph the image. That is, the camera module 350 determines whether clock data included in the photographed reference image is interrupted to compare the number of frames per unit time in the photographed image than that in the photographed reference image, thereby determining whether the number of frames per unit time in the photographed image is identical with that in the photographed reference image. When the number of frames per unit time in the photographed image quality differs from that in the photographed reference image, the receiving side may reduce the quality of the photographed image and control the quality of the photographed image to correspond to the quality of the displayed reference image.

Figure 4:
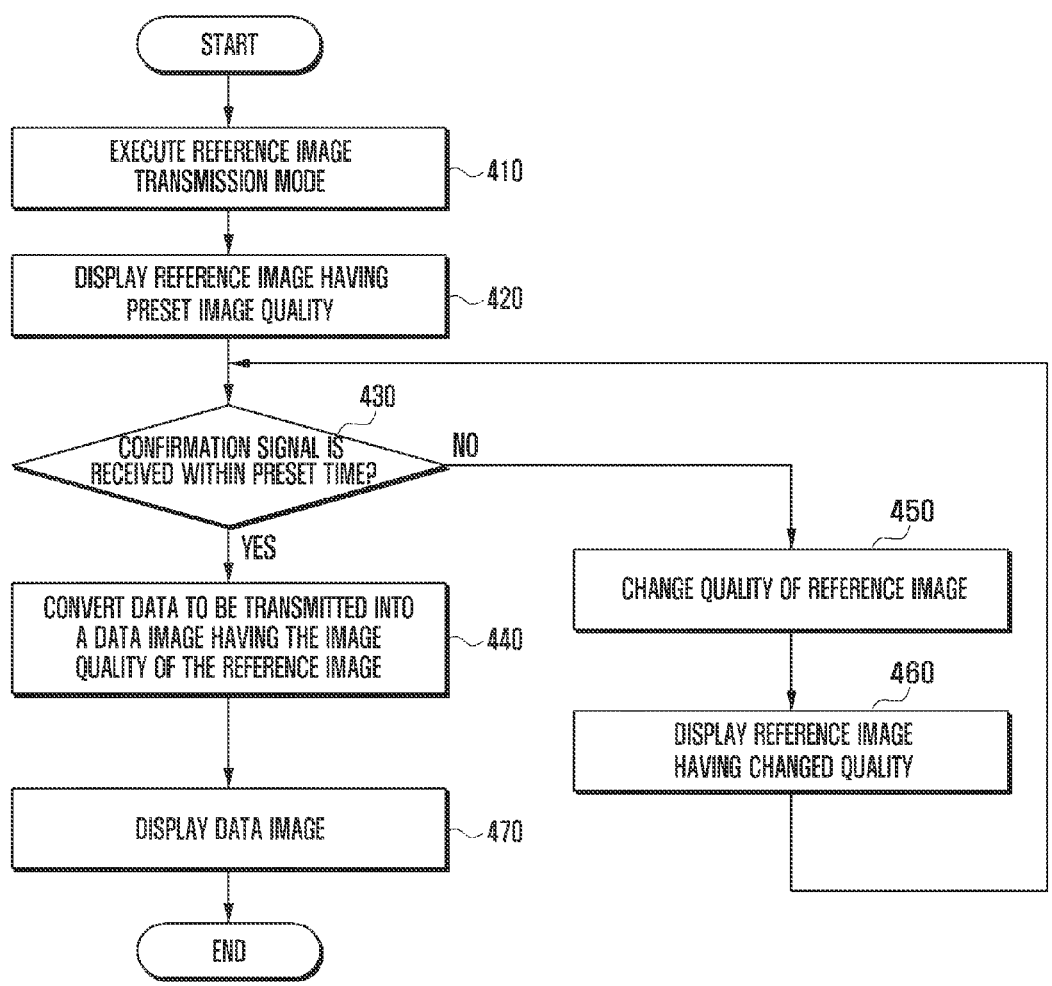
FIG. 4 is a flowchart illustrating a method for transmitting data using digital image processing according to an exemplary embodiment of the present invention.

FIG. 4 is a flowchart illustrating a method for transmitting data using digital image processing according to an exemplary embodiment of the present invention.

First, a controller 260 executes a reference image transmission mode according to user input at step 410. The reference image transmission mode may be a function of the apparatus 200 itself for transmitting data and may be executed by executing a certain application.

Next, the controller 260 retrieves a reference image having preset image quality from a memory 240 and controls the display unit 250 to display the retrieved reference image at step 420. In this case, the image quality is determined by the number of frames per unit time. Accordingly, the controller 260 controls the display unit to display a reference image having the certain number of frames per unit time.

Characters, numerals, alphabets, or images that may continuously change according to a variation in each frame are displayed on the reference image according to an exemplary embodiment of the present invention. The continuous characters, numerals, alphabets, or images are displayed as the certain number of frames per unit time. Examples of the reference image are shown in FIGS. 6 to 8. FIG. 6 displays continuous clock data obtained by changing colors and brightness of dots according to variation in each frame according to an exemplary embodiment of the present invention. FIGS. 7 and 8 illustrate characters, numerals, or images continuously displayed in the same manner according to an exemplary embodiment of the present invention. The clock data is included in each frame of a reference image having the certain number of frames per unit time. The receiving side may receive the reference image and determine which image quality corresponds to the reference image, that is, how many frames per unit time there are in the reference image.

The controller 260 determines whether a confirmation signal is received within the preset time at step 430. Here, the confirmation signal is a signal received from the receiving side indicating that transmission of the data is possible. The confirmation signal may be received through an audio processor 220 or a signal receiver 230.

Next, the controller 260 converts data to be transmitted into a data image having the image quality of the reference image at step 440. Through the foregoing procedure, the data image and the quality of an image photographed by a camera of a receiving side are equally synchronized to achieve data transmission.

Furthermore, the controller 260 controls the display unit 260 to display the data image at step 470.

When it is determined at step 430 that the confirmation signal is not received within the preset time, the controller 260 changes the quality of the reference image at step 450. The controller 260 retrieves a corrected reference image having different quality from the memory 240 at step 450. Subsequently, the controller 260 controls the display unit 250 to display the corrected reference image at step 460.

In this case, the controller 260 may control such that a corrected reference image having the number of frames per unit time smaller than that of a current reference image is displayed.

When the quality of the image photographed by the camera of the receiving side is better than quality of the reference image, that is, when the number of frames per unit time in the quality of an image photographed by the camera of the receiving side is greater than that of the displayed reference image, although the quality of the image photographed by the camera is identical with the quality of the reference image, the receiving side may recognize variation in clock data included in the reference image to check and process the number of frames in an image to be transmitted. In this case, it is convenient for the receiving side to control the quality of the photographed image and to reduce the quality of the photographed image to correspond to the image quality of the displayed reference image. That is, the receiving side determines whether clock data included in the displayed reference image is interrupted to compare the number of frames per unit time in the photographed image quality with that in the photographed reference image, thereby determining whether the number of frames per unit time in the photographed image quality is identical with that in the photographed reference image. When the number of frames per unit time in the photographed image quality differs from that in the photographed reference image, the receiving side may reduce the photographed image quality and control the quality of the photographed image to correspond to the quality of the displayed reference image.

However, when the quality of an image photographed by the camera in the receiving side is worse than the image quality of the displayed reference image, that is, when the number of frames per unit time of the photographed image quality by the camera is less than that of the image quality in the displayed reference image, there is greater probability of failing recognition of the reference image by the receiving side. Accordingly, in this case, since it is more convenient for the sending side to control the image quality of the reference image, the controller 260 controls the display unit 250 to reduce the quality of the reference image and to display the corrected reference image.

Figure 5:
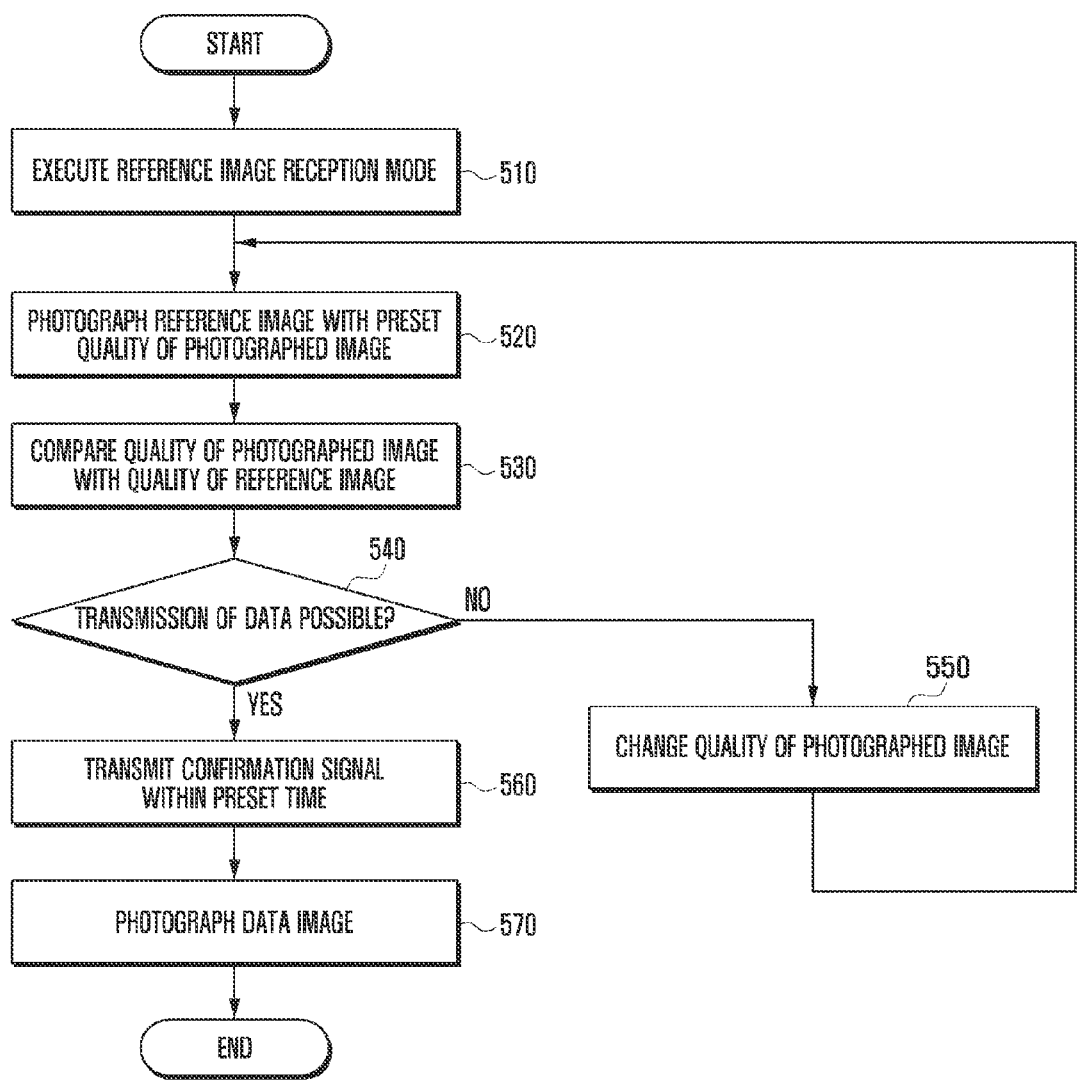
FIG. 5 is a flowchart illustrating a method for receiving data using digital image processing according to an exemplary embodiment of the present invention.

FIG. 5 is a flowchart illustrating a method for receiving data using digital image processing according to an exemplary embodiment of the present invention.

First, a controller 360 executes a reference image reception mode according to user input at step 510. The reference image reception mode may be a function of the apparatus 300 itself for receiving data, and may be executed by executing a certain application.

Next, the controller 360 photographs a reference image displayed on a display unit 250 of a sending side with preset quality of a photographed image at step 520. In this case, the photograph quality is determined by a number of frames per unit time in the same manner in the image quality. Accordingly, the controller 360 controls the camera module 350 to photograph a displayed reference image with certain quality of a photographed image having the number of frames per unit time.

The controller 360 compares quality of a photographed image with the quality of the displayed reference image at step 530. That is, the controller 360 compares the number of frames per unit time in the photographed image with the number of frames per unit time in the photographed reference image. Subsequently, the controller 360 determines whether transmission of data is possible at step 540. That is, the controller 360 determines whether clock data included in the photographed reference image is interrupted to compare the number of frames per unit time in the photographed image with that in the photographed reference image, thereby determining whether the number of frames per unit time in the photographed image is identical with that in the photographed reference image. When the number of frames per unit time in the photographed image is identical with that in the photographed reference image, the controller 360 determines that the transmission of the data is possible. Conversely, when the number of frames per unit time in the photographed image differs from that in the photographed reference image, the controller 360 determines that the transmission of the data is not possible.

When it is determined at step 540 that the transmission of the data is possible, the controller 360 transmits a confirmation signal within a preset time at step 560, and controls the camera module 350 to photograph a data image displayed on the display unit 250 of the sending end at step 570.

When it is determined at step 540 that the transmission of the data is not possible, the controller 360 may control the camera module 350 to change the quality of the photographed image at step 550. When changing the quality of the photographed image, the controller 360 may control the camera module 350 to have the quality of the photographed image differ from the preset quality of a photographed image. In this case, the controller 360 may control the number of frames per unit time to be less than that of currently set quality of the photographed image.

When the quality of an image photographed by the camera module 350 is worse than the quality of the displayed reference image, that is, when the number of frames per unit time of the quality of the photographed image is less than that of the quality in the displayed reference image, there is greater probability of failing recognition of the reference image by the receiving side. Accordingly, in this case, since it is more convenient for the sending side to control the image quality of the reference image, the device 300 for receiving data does not send the confirmation signal within the preset time and the controller 260 reduces the quality of the reference image and displays the corrected reference image.

Conversely, when the quality of the image photographed by the camera module 350 is better than image quality of the displayed reference image, that is, when the number of frames per unit time of the quality of an image photographed by the camera module is greater than that of the displayed reference image, the camera module 350 may recognize a variation in clock data included in the reference image to check and process the number of frames in an image to be transmitted. Accordingly, in this case, because it is more convenient to control the quality of the image photographed by the camera module 350, the controller 360 may control the camera module 350 to reduce the quality of the photographed image and to photograph the image. That is, the camera module 350 determines whether clock data included in the photographed reference image is interrupted to compare the number of frames per unit time in the photographed image with that in the photographed reference image, thereby determining whether the number of frames per unit time in the photographed image is identical with that in the photographed reference image. When the number of frames per unit time in the photographed image quality differs from that in the photographed reference image, the receiving side may reduce the quality of the photographed image and control the quality of the photographed image to correspond to the quality of the photographed reference image.

In the exemplary embodiments of the present invention, when transmitting data without a separate transceiver supporting a certain communication scheme, data synchronization of a receiving end and a sending end is thus possible to more conveniently transmit/receive data.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting data using digital image processing, the method comprising:
   displaying a first reference image comprising one or more frames, the first reference image being configured to have preset image quality and include clock data for synchronization of the data in each frame;
   determining whether a confirmation signal indicating that transmission of the data is possible is received within a preset time;
   displaying a second reference image having an image quality differing from the preset image quality if the confirmation signal is not received within the preset time; and
   converting the data into an image data having the quality of the first reference image if the confirmation signal is received within the preset time.

2. The method of claim 1, wherein the clock data included in the reference image comprises at least one of variation in color, variation in luminance, and binary variation using dots.

3. The method of claim 1, further comprising:
   displaying the image data.

4. The method of claim 3, wherein the converting of the data comprises converting the data into Red/Green/Blue (RGB) data of a certain format.

5. The method of claim 1, wherein the image quality is determined by a number of frames per unit time.

6. The method of claim 5, wherein the displaying of the second reference image comprises displaying the second reference image having the number of frames per unit time smaller than that of the first reference image.

7. A method for receiving data using digital image processing, the method comprising:
   photographing a reference image comprising one or more frames displayed on a sending side with a preset quality of a photographed image;
   comparing the quality of the photographed image with an image quality of the photographed reference image to determine whether transmission of the data is possible;
   changing the quality of the photographed image when the transmission of the data is not possible; and
   photographing, with the changed quality of the photographed image, the reference image.

8. The method of claim 7, wherein the image quality is determined by a number of frames per unit time.

9. The method of claim 7, wherein the determining of whether the transmission of the data is possible comprises:

transmitting a confirmation signal indicating that the transmission of the data is possible when the transmission of the data is possible;

photographing an image data obtained by converting the data into an image data having the image quality of the reference image; and converting the photographed image data into original data.

10. The method of claim 9, wherein the changing of the quality of the photographed image comprises reducing a number of frames per unit time of the photographed image.

11. The method of claim 9, wherein the determining of whether the transmission of the data is possible comprises:

determining whether clock data included in the photographed reference image is interrupted to determine whether the number of frames per unit time in the photographed image differs from that in the photographed reference image.

12. The method of claim 11, wherein the clock data included in the reference image comprises at least one of variation in color, variation in luminance, and binary variation using dots.

13. An apparatus for transmitting data using digital image processing, the apparatus comprising:

a display unit for displaying an image comprising one or more frames;

a memory for storing a first reference image, the first reference image being configured to have preset image quality and include clock data for synchronization of the data in each frame and the data;

a signal receiver for receiving a confirmation signal indicating that transmission of the data is possible; and a controller for controlling to display the first reference image, for determining whether the confirmation signal is received within a preset time, for controlling such that a second reference image having an image quality differing from the preset image quality is displayed if the confirmation signal is not received within a preset time, and for converting the data into an image data having the quality of the first reference image if the confirmation signal is received within the preset time.

14. The apparatus of claim 13, wherein the clock data included in the reference image comprises at least one of variation in color, variation in luminance, and binary variation using dots.

15. The apparatus of claim 13, wherein the controller is further configured to control such that the image data is displayed.

16. The apparatus of claim 15, wherein the controller is configured to convert the data into Red/Green/Blue (RGB) data of a certain format.

17. The apparatus of claim 13, wherein the image quality is determined by a number of frames per unit time.

18. The apparatus of claim 17, wherein the controller is configured to display the corrected second reference image having the number of frames per unit time smaller than that of the first reference image.

19. An apparatus for receiving data using digital image processing, the apparatus comprising:

a camera module for photographing an image comprising one or more frames displayed on a sending side; and a controller for controlling to photograph a reference image displayed on the sending side with a preset quality of a photographed image, for comparing the quality of the photographed image with an image quality of the photographed reference image to determine whether transmission of the data is possible, for changing the quality of the photographed image when the transmission of the data is not possible, and for controlling such that the reference image is photographed with the changed quality of the photographed image.

20. The apparatus of claim 19, wherein the image quality and the quality of the photographed image are determined by a number of frames per unit time.

21. The apparatus of claim 19, further comprising a transceiver for transmitting a confirmation signal indicating that transmission of the data is possible, wherein the controller is configured to transmit a confirmation signal indicating that the transmission of the data is possible when the transmission of the data is possible, controls to photograph an image data obtained by converting the data into an image data having the image quality of the reference image, and converts the photographed image data image-into original data.

22. The apparatus of claim 21, wherein the controller is configured to reduce a number of frames per unit time of the photographed image when changing the quality of the photographed image.

23. The apparatus of claim 21, wherein the controller is configured to determine whether clock data included in the photographed reference image is interrupted to determine whether the number of frames per unit time in the photographed image differs from that in the photographed reference image.

24. The apparatus of claim 23, wherein the clock data included in the reference image comprises at least one of variation in color, variation in luminance, and binary variation using dots.

* * * * *